(12) United States Patent
Sawada

(10) Patent No.: US 6,501,800 B1
(45) Date of Patent: Dec. 31, 2002

(54) VARIABLE BIT-RATE ENCODING DEVICE

(75) Inventor: Hideki Sawada, Tokyo (JP)

(73) Assignee: NEC Corporation, Tokyo (JP)

( * ) Notice: Subject to any disclaimer, the term of this patent is extended or adjusted under 35 U.S.C. 154(b) by 285 days.

(21) Appl. No.: 09/661,780

(22) Filed: Sep. 14, 2000

(30) Foreign Application Priority Data

Sep. 14, 1999 (JP) ............................................ 11-260753

(51) Int. Cl.⁷ .............................. H04N 7/12; H04N 7/32
(52) U.S. Cl. ............................ 375/240.16; 375/240.16; 348/419.1
(58) Field of Search ........................ 375/240.02, 240.03, 375/240.05, 240.07, 240.04, 240.12, 240.13, 240.16; 348/384.1, 14, 390, 401.1, 407.1, 419.1; 455/38.3, 574; H04N 7/32, 7/12

(56) References Cited

U.S. PATENT DOCUMENTS

| | | | | |
|---|---|---|---|---|
| 5,231,484 A | * | 7/1993 | Gonzales et al. | ...... 375/240.04 |
| 5,949,484 A | * | 9/1999 | Nikaya et al. | ............ 348/384.1 |
| 6,016,162 A | * | 1/2000 | Odaka et al. | .......... 375/240.04 |
| 6,052,417 A | * | 4/2000 | Fujiwara et al. | ............ 375/240 |

FOREIGN PATENT DOCUMENTS

| | | | | |
|---|---|---|---|---|
| JP | 6-141298 | 5/1994 | | |
| JP | 07281699 A | * | 10/1995 | |
| JP | 9-93537 | 4/1997 | | |
| JP | 09327023 A | * | 12/1997 | ............ H04N/7/32 |

* cited by examiner

*Primary Examiner*—Nhon Diep
(74) *Attorney, Agent, or Firm*—Whitham, Curtis & Christofferson, P.C.

(57) ABSTRACT

A variable bit-rate encoding device is provided that can perform a variable bit-rate encoding process at high rate. The subtracter 103 calculates a predictive error between compressed frame data and motion-compensated reference frame data and then outputs it to the code-amount allocator 107. The code-amount allocator 107 calculates and stores the power for each unit section of a predictive error. Thus, at the time the image data has been completely processed, a target code amount allocated to each unit section in a second pass encoding is decided based on the power of a predictive error of the whole image data and based on the power of a predictive error for each unit section. The motion vector memory 114 stores a motion vector for each macroblock. Upon an actual second pass encoding, the motion compensator 115 motion-compensates the reference frame input from the frame memory 116 according to the motion vector value and then outputs the motion-compensated reference frame to the subtracter 113.

27 Claims, 7 Drawing Sheets

| | | | | | | | |
|---|---|---|---|---|---|---|---|
| e 00 | e 01 | e 02 | e 03 | e 04 | e 05 | e 06 | e 07 |
| e 10 | e 11 | e 12 | e 13 | e 14 | e 15 | e 16 | e 17 |
| e 20 | e 21 | e 22 | e 23 | e 24 | e 25 | e 26 | e 27 |
| e 30 | e 31 | e 32 | e 33 | e 34 | e 35 | e 36 | e 37 |
| e 40 | e 41 | e 42 | e 43 | e 44 | e 45 | e 46 | e 47 |
| e 50 | e 51 | e 52 | e 53 | e 54 | e 55 | e 56 | e 57 |
| e 60 | e 61 | e 62 | e 63 | e 64 | e 65 | e 66 | e 67 |
| e 70 | e 71 | e 72 | e 73 | e 74 | e 75 | e 76 | e 77 |

FIG.10A
BEFORE CONVERTION

FIG.10B
AFTER CONVERTION

FIG. 11
PRIOR ART

VARIABLE BIT-RATE ENCODING DEVICE

BACKGROUND OF THE INVENTION

The present invention relates to a variable bit-rate encoding device. More particularly, the present invention relates to a two-pass-system encoding device that encodes moving picture (image) data at a variable bit-rate.

The moving image data encoding technique has a constant bit-rate encoding method and a variable bit-rate encoding method.

Figure 3:
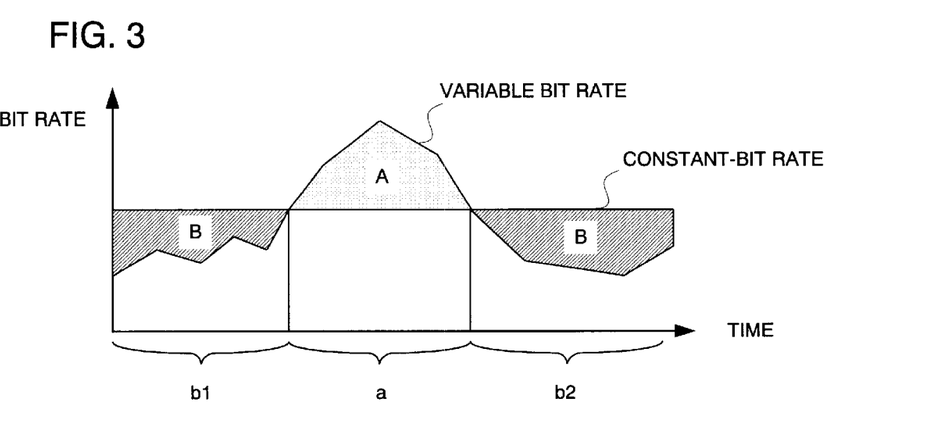
FIG. 3 is a diagram illustrating relationships between time and encoded bit-rate when moving picture data is encoded at a constant-bit rate and at a variable bit-rate.

FIG. 3 is a diagram illustrating the relationship between time and encoded bit-rate in the case where a certain set of moving image data is subjected to the constant bit-rate encoding and the variable bit-rate encoding.

In the constant bit rate encoding shown in FIG. 3, the bit rate is always constant. On the other hand, in the variable bit-rate encoding, the bit rate varies due to the complexity of image data. Since the duration (a) is for image data relatively difficult to be handled, encoding is performed at a high bit rate. Since the duration (b1) and the duration (b2) are for image data relatively easy to be handled, encoding is performed at a low bit rate.

In the variable bit-rate encoding, a large quantity of codes is allocated to complicated images while a small quantity of codes is allocated to simple images. Consequently, moving image data can be encoded with the image quality maintained uniformly.

In the constant bit-rate encoding, information may not be sufficient in the duration (a) in which much information are produced as shown in the area A shown in FIG. 3. Information may be encoded redundantly in the duration (b1) or (b2) in which less information are produced, as shown in the area B shown in FIG. 3.

Accordingly, it may be generally said that the variable bit-rate encoding method is effective, in regard to the image quality.

The so-called two-pass system variable bit rate encoding scheme is known as one of variable bit-rate encoding schemes.

In the two-pass system variable bit-rate encoding method, an information amount generated per unit section of all sequences of moving images is analyzed in the first pass and a target code amount for each unit section is allocated based on the analyzed result. Thereafter, while the generated code amount for each unit section in the second pass is controlled to bring close to a target code amount, an actual encoding is performed.

As described above, the two-path system variable bit-rate encoding method is characterized in that an ideal variable bit rate control is performed because a target code amount for each unit section is allocated by analyzing the information generation amount of all sequences for a moving image, prior to an actual encoding.

Figure 11:
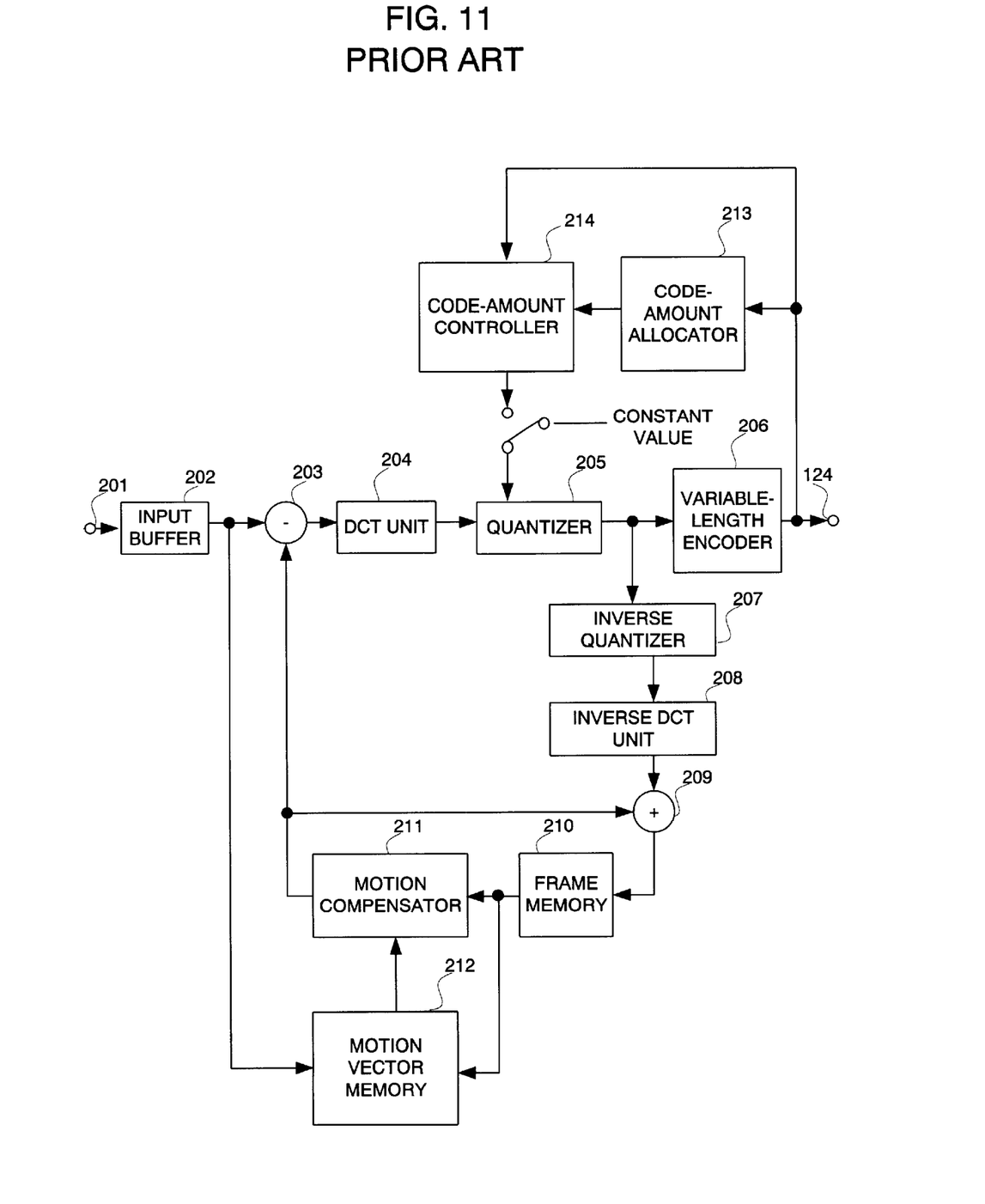
FIG. 11 is a block diagram illustrating a conventional two-path system variable bit-rate encoding device.

FIG. 11 is a block diagram illustrating a conventional two-pass variable bit-rate encoding device.

As shown in FIG. 11, the conventional variable bit rate encoding device consists of an input buffer 202 with an input terminal 201, a subtracter 203, a DCT (Discrete Cosine Transform) unit 204, a quantizer 205, a variable length encoder 206, an inverse quantizer 207, an inverse DCT unit 208, an adder 209, a frame memory 210, a motion compensator 211, a motion vector searcher 212, a code amount allocator 213, a code amount controller 214, and an output terminal 215.

Image data input from the input terminal 201 is supplied in line units to the input buffer 202.

Figure 4:
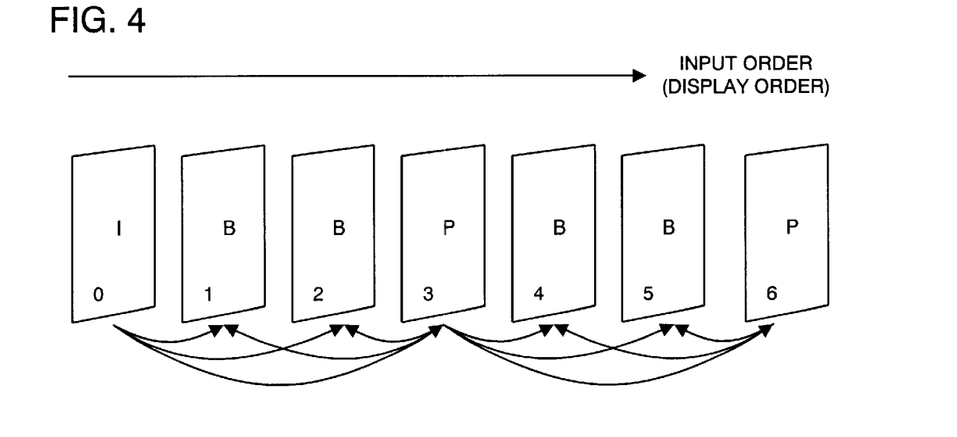
FIG. 4 is a conceptual diagram explaining the predictive coding according to the first embodiment of the present invention.

As shown in FIG. 4, input image data to encoded as one of an I (Intra) frame, a P (Prediction) frame, or a B (Bi-directional) frame.

I frame is a frame encoded in an inter frame process only and does not undergo an inter motion compensation frame predictive encoding. I frame also is used as a reference frame for the successive P and B frames.

P frame is a reference frame an I or P frame in the forward direction on the time axis and is used to perform an inter motion compensation frame predictive encoding in one direction. P frame is used as a reference frame for the other successive P and B frames.

B frame is a reference frame for the I or P frame in the forward direction and backward direction on the time axis and is used to perform an inter motion compensation predictive encoding in two directions. The B frame is not used in the reference frame of other frame.

The input buffer 202 rearranges input image data in an encoding order and outputs the output signal to the subtracter 203 and the motion vector searcher 212 in encoded block units or in macroblock units.

In FIG. 4 as previously described, the third P frame, for example, is encoded earlier than the first and second B frames to use the third P frame as a reference frame. Hence, the input buffer 202 rearranges images.

Figure 5:
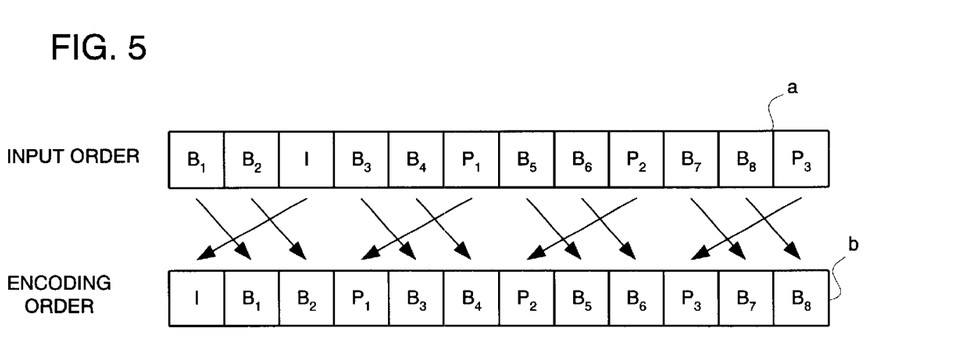
FIG. 5 is a conceptual diagram explaining the predictive encoding according to the first embodiment of the present invention.

FIG. 5 shows the rearrangement operation. The image data input shown with input order in FIG. 5 are supplied in the order shown with encoding order in FIG. 5.

The macroblock is a minimum unit for a motion compensation prediction and corresponds to image data of 16×16 pixels. The macroblock data is configured of the brightness block Y of 8×3 pixels and the color-difference blocks Cr and Cb. The total block number depends on a color-difference data thinned-out type.

Figure 6A:
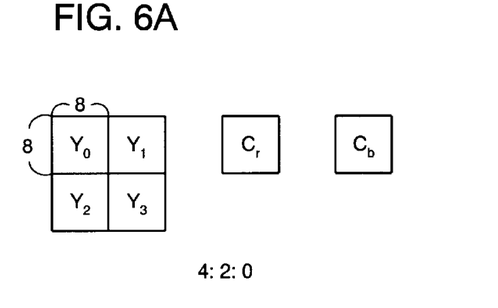
FIG. 6A, FIG. 6B and FIG. 6C are conceptual diagrams explaining macroblocks used in the first embodiment of the present invention.
Figure 6B:
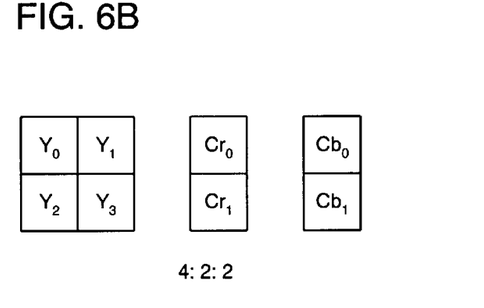
Figure 6C:
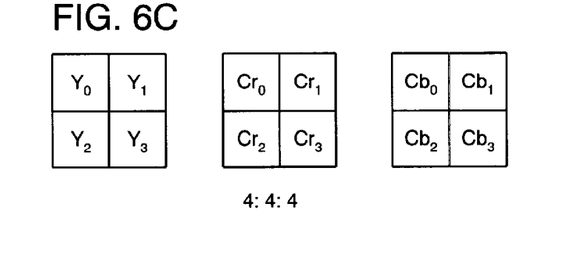

When the thinned-out type is 4:2:0, as shown in FIG. 6A, there are 6 blocks including 4 brightness blocks Y, one color-difference block Cr, and one color-difference block Cb. When the thinned-out type is 4:2:2. as shown in FIG. 6B, there are 8 blocks including 4 brightness blocks Y, 2 color-difference blocks Cr, and 2 color-difference blocks Cb. When the thinned-out type is 4:4:4. as shown in FIG. 6C. there are 12 blocks including 4 brightness blocks Y, 4' color-difference blocks Cr and 4 color-difference blocks Cb.

The subtracter 203 receives compressed block data output from the input buffer 202 and reference macroblock data motion-compensated with the motion compensator 211 and then outputs these interframe predictive error signals to the DCT unit 204.

The DCT unit 204 subjects each interframe predictive error signal to a DCT process to separate it into horizontal and vertical frequency components. Thus, the DCT unit 204 outputs the horizontal and vertical frequency components to the quantizer 205.

The quantizer 205 quantizes the output from the DCT unit 204 to reduce the code amount. Thus, the quantizer 205 outputs the result to the variable length encoder 206 and the inverse quantizer 207. The quantizer 205 performs a fixed quantization with the quantization step size of a fixed value in the first pass tentative encoding. The quantizer 205 also performs a fixed quantization with the quantization step size set by the code amount controller 214 in an actual second pass encoding.

The inverse quantizer 207 inverse-quantizes the output of the quantizer 205 and then outputs the result to the inverse DCT unit 208.

The inverse DCT unit 208 subjects the output of the inverse quantizer 207 to an inverse DCT process and then outputs the result to the adder 209.

The adder 209 adds the reference macroblock data motion-compensated by the motion compensator 211 and the output of the inverse DCT unit 208. Then, the adder 209 outputs the resultant sum to the frame memory 210.

The frame memory 210 outputs macroblock data acting as new reference frames data to the motion compensator 211 and the motion vector searcher 212.

The motion vector searcher 212 receives the macroblock data of a compressed frame from the input buffer 202 as well as the macroblock data of a reference frame from the frame memory 210. The motion vector seacher 212 implements the block matching between the input macroblock data sets to obtain a motion vector between the reference frame and the compressed frames and then outputs it to the motion compensator 211.

The frame memory 210 provides reference frame data to the motion compensator 211. The motion compensator 211 motion-compensates the reference frame data with the motion vector from the motion vector searcher 212 to create reference macro block data. Thus, the motion compensator 211 supplies it to the subtracter 203.

The variable length encoder 206 subjects the output of the quantizer 205 to a variable length encoding. The result is supplied to the code amount allocator 213 in the first pass tentative encoding and to the code amount controller 213 in the second pass tentative encoding. At the same time, the result is output via the output terminal 215.

The variable length encoder 206 inputs codes generated in the first pass tentative encoding to the code amount allocator 213. The code amount allocator 213 stores the code amount generated in the first pass tentative encoding for each unit section and determines a target code amount, allocated in each unit section in an actual second pass encoding at the time when the first pass tentative encoding has been ended.

Figure 7:
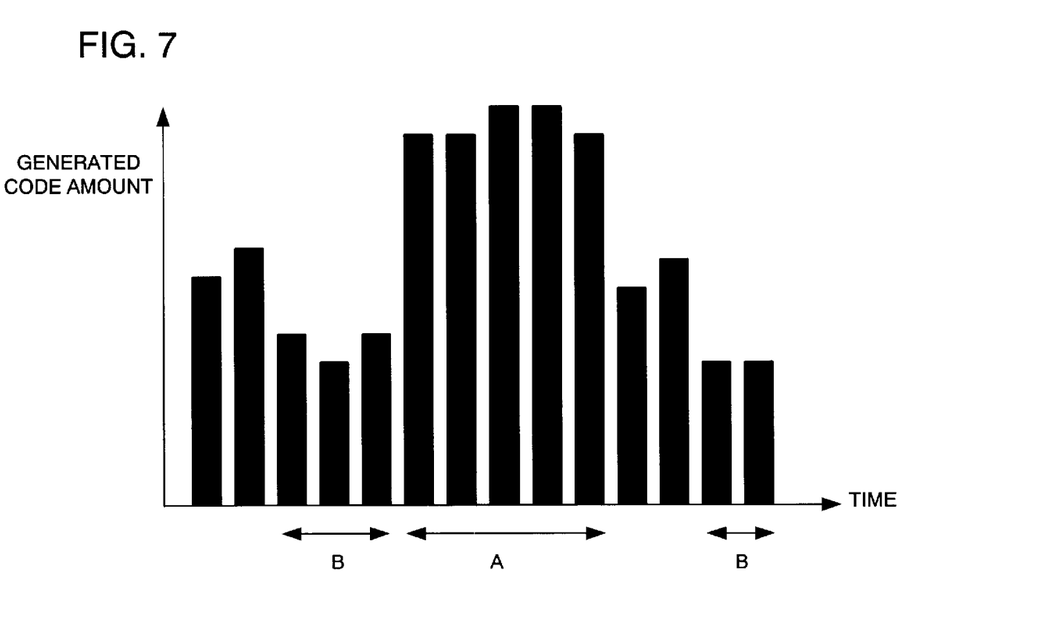
FIG. 7 is a diagram illustrating a generated code amount for unit section at a predictive encoding in the first pass.

FIG. 7 is a diagram showing generated code amounts for each unit section in the first pass tentative encoding. As shown in FIG. 7, the B section representing a relatively simple scene corresponds to a small generation code amount. The A section representing a relatively difficult scene corresponds to a large generation code amount. Consequently, in an actual second pass encoding, a larger target code amount is allocated to the A section while a smaller target code amount is allocated to the B section.

The code amount controller 214 adjusts the quantized step size to bring the code amount generated in an actual second pass encoding close to the target code amount set in the first pass encoding and then outputs the result to the quantizer 205. That is, the code amount controller 214 determine a suitable quantized step size based on the difference between a target code amount for each unit section input from the code amount allocator 213 and an actually generated code amount input from the variable length encoder 206.

A typical example of the above-mentioned two-pass system variable bit rate encoding device is disclosed in JP-A No. 141298/1994 and JP-A No. 93537/1997.

However, in such a two-pass system variable bit rate encoding device, a sequence of encoding steps including the first pass tentative encoding and the second pass actual encoding have to be repeated twice. Accordingly, the problem is that encoding moving images at a constant bit rate requires the processing time twofold.

SUMMARY OF THE INVENTION

The present invention is made to solve the above-mentioned problems.

The objective of the invention is to provide a novel two-pass system variable bit rate encoding device that can solve the problems occurring in the prior art.

The objective of the present invention is achieved by a two-pass system variable bit-rate encoding device, wherein moving picture data is encoded at a variable bit rate, comprising first encoding means for calculating a power for each unit section of a predictive error, using correlation between the power of a predictive error in inter motion compensation frame prediction and a generated code amount in a first pass, and for determining a target code amount allocated to each unit section in a second pass encoding, according to the magnitude of the predictive error power of the whole image data and the magnitude of the predictive error power for each unit section; and second encoding means for performing an encoding process while controlling a generated code amount to adjust the target code amount for each unit section in the second pass.

In the variable bit-rate encoding device according to the present invention, a target code amount is allocated in proportional distribution based on a predictive error power in each unit section and based on a predictive error power of the whole image data.

Moreover, in the variable bit-rate encoding device according to the present invention, a target code amount is compensated to set a coded rate within a predetermined range based on a predictive error power in each unit section and based on a predictive error power of the whole image data.

A motion vector value, which is obtained by searching a, motion vector for inter motion compensation frame prediction in the first pass by means of the first encoding means, is used without any change during a second pass encoding by the second encoding means. Thus, the motion vector searching process in the second pass is omitted.

The first encoding means comprises a first subtracter for receiving compressed macroblock image data rearranged in an encoding frame order by an input buffer and reference macroblock image data motion-compensated by a first motion compensator (to be defined later) and then calculating an inter frame predictive error signal of the two sets of image data; a first frame memory for storing macroblock image data output from the input buffer; a motion vector searcher for receiving the reference macroblock image data from the first frame memory and compressed macroblock image data from the input buffer, and then performing a block matching process to macroblock data within a research range of the reference macroblock image data, thus obtaining a motion vector; a first motion compensator for receiving the motion vector from the motion vector searcher and then creating the reference macroblock image data motion-compensated; and a code-amount allocator for obtaining a power of each GOP (Group of Pictures), the GOP being configured of a plurality of frames of the inter frame predictive error signal supplied from the first subtracter, and then determining a target code amount allocated to each GOP in an actual encoding process by the second encoding means according to the power of a predictive error signal for each GOP.

The second encoding means comprises a second subtracter for receiving compressed macroblock image data rearranged in an encoding frame order by an input buffer and reference macroblock image data motion-compensated by a second motion compensator (to be defined later) and then calculating an inter frame predictive error signal of the two sets of image data; a DCT unit for performing a DCT process of an inter frame predictive error signal output from the second subtracter: a quantizer for quantizing a DCT output from the DCT unit; an inverse quantizer for inverse quantizing a quantized output from the quantizer; an inverse DCT unit for performing an inverse DCT unit of an output from the inverse quantizer; an adder for adding an output from the inverse DCT unit and reference macroblock image data motion-compensated by a second motion compensator (to be defined later); a motion vector memory for storing the motion vector output from the motion vector searcher; a second frame memory for storing an output from the adder; a second motion compensator for motion-compensating reference frame data supplied from the second frame memory with a motion vector from the motion vector memory and then supplying the result to the second subtracter and the adder; a variable length encoder for variable-length-encoding a quantized output from the quantizer; and a code-amount allocator for controlling a code amount based on a code amount actually generated from the variable-length encoder and based on a target code amount for each unit section output from the code amount allocater in the first encoding means.

The first encoding means further comprises a motion vector decision unit for supplying an output from the motion vector searcher to the code-amount allocator. The motion vector decision unit decides a motion vector movement output from the motion vector searcher and adjusts a target code amount to be allocated according to the motion vector movement.

Moreover, in the variable bit rate encoding device according to the present invention, the first and second subtracters may be integrated as one piece. The first and second motion compensators may be integrated as one piece. The first and second frame memories may be integrated as one piece. Thus, each one-piece component can be shared in time divisional mode, using the first encoding means and the second encoding means.

BRIEF DESCRIPTION OF THE INVENTION

This and other objects, features, and advantages of the present invention will become more apparent upon a reading of the following detailed description and drawings, in which.

DESCRIPTION OF THE EMBODIMENTS

Preferred embodiments of the present invention will be described in detail with reference to the attached drawings.

First Embodiment

Figure 1:
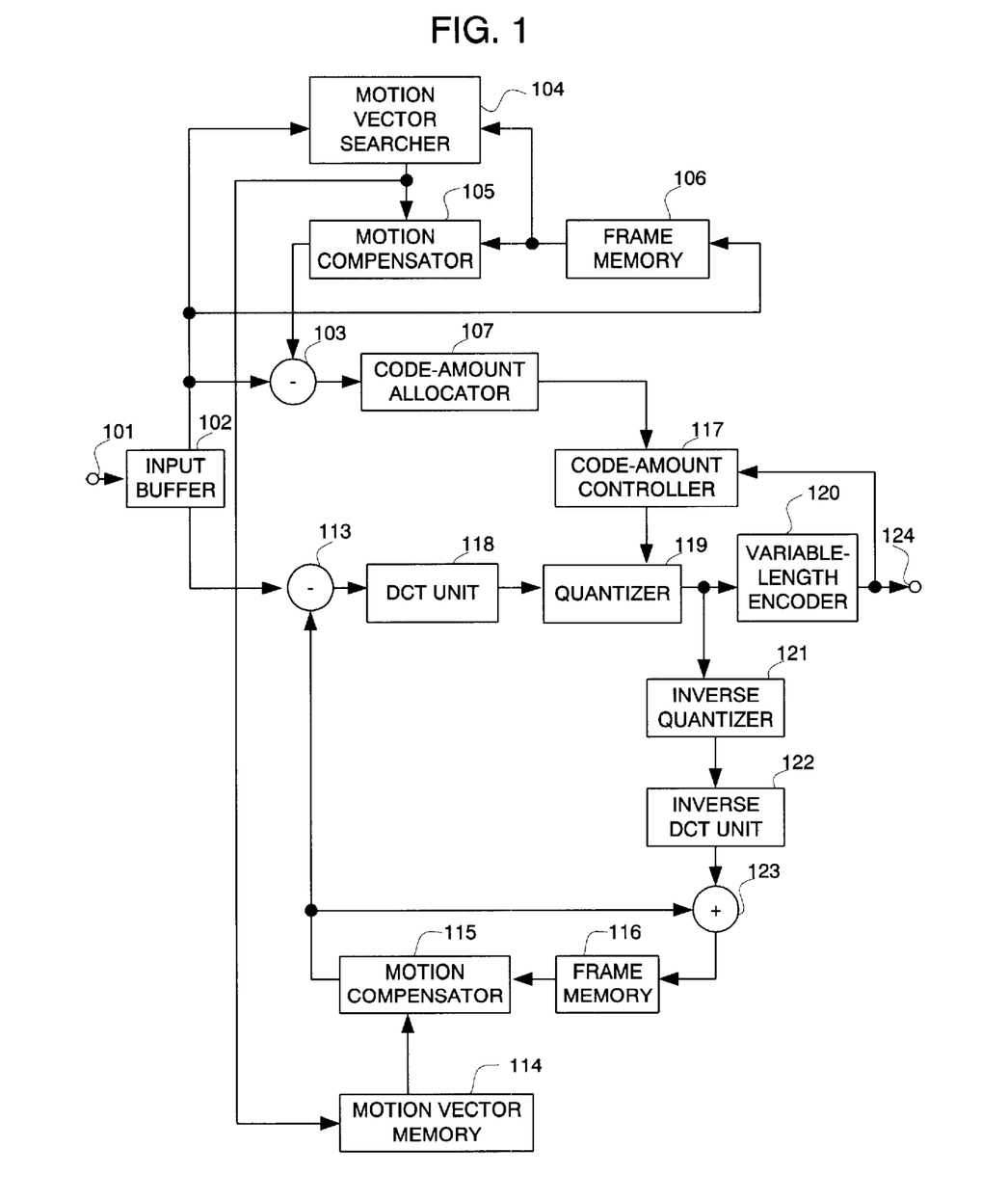
FIG. 1 is a block diagram illustrating a variable bit-rate coding device according to a first embodiment of the present invention.

FIG. 1 is a block diagram illustrating the configuration of a variable bit rate encoding device according to the first embodiment of the present invention.

Referring to FIG. 1, the variable bit rate encoding device consists of an input buffer 102 with an input terminal 101, a subtracter 103, a motion vector searcher 104, a motion compensator 105, a frame memory 106, a code amount allocator 107, a subtracter 113, a motion vector memory 114, a motion compensator 115, a frame memory 116, a code amount controller 117, a DCT unit 118, a quantizer 119, a variable length encoder 120, an inverse quantizer 121, an inverse DCT unit 122, an adder 123, and an output terminal 124.

Referring to FIG. 1, the subtracter 103 calculates a predictive error between compressed frame data input from the input data 102 and reference data motion-compensated input to the motion compensator 105 and then outputs it to the code amount allocator 107. The code amount allocator 107 stores a power per unit section of a predictive error, input from the subtracter 103. The code amount allocater 107 determines a target code amount allocated to each unit section in the second pass encoding based on the power of a predictive error of the entire image data and based on the power of a predictive error for unit section, at the time the entire image data has been processed. The motion vector memory 114 stores a motion vector searched by the motion vector searcher 104 in units of encoding (hereinafter, referred to as a macroblock). The motion compensator 115 motion-compensates a reference frame input from the frame memory 116, according to the motion vector value.

The portion ranging from the subtracter 103 to the code amount allocator 107 configures a block that operates in a first pass encoding process, acting as the first encoding means. The portion ranging from the subtracter 113 to the adder 123 configures a block that operates in a second pass encoding process, acting as second encoding means.

The subtracters 103 and 113, the motion compensators 105 and 115, the frame memories 106 and 116 are respectively depicted for the sake of convenience. Because of the nature of the two-pass system, the first pass and the second pass are not operated in parallel but may be shared in the time divisional operation.

On the first pass, image data is input to the input buffer 102 via the input terminal 101. The input buffer 102 rearranges the image data in the encoding order and sends it to the subtracter 103 and the motion vector searcher 104, and the frame memory 106 in macroblock units. The subtracter 103 calculates an interframe predictive error signal and then supplies it to the code amount allocator 107. The motion vector searcher 104 performs a motion vector search for inter motion-compensation-frame prediction and then sends the motion vector to the motion compensator 105 and the motion vector memory 114. The motion compensator 105 creates a reference macroblock motion-compensated and then outputs it to the subtracter 103. The code amount allocator 107 determines a target code amount per unit section in the second pass based on the power for each unit section of the predictive error signal and then sends it to the code amount controller 117.

The subtracter 113 obtains an interframe predictive error signal in the second pass to output it to the DCT unit 118. The DCT unit 118 performs a DCT process of the interframe predictive error signal and then supplies it to the quantizer 119. The quantizer 119 quantizes the DCT output and then supplies it to the variable length encoder 120 and the inverse quantizer 121. The inverse quantizer 121 inverse-quantizes the quantized output and then supplies the result to the inverse DCT unit 122. The inverse DCT unit 122 performs an inverse DCT process of the inverse quantized output and then supplies it to the adder 123. The adder 123 adds motion-compensated reference macroblock data and the inverse DCT output and then outputs the sum to the frame memory 116. The reference frame data stored in the frame memory 116 is supplied to the motion compensator 115. The motion compensator 115 motion-compensates the reference frame data input from the frame memory 116 with the motion vector from the motion vector memory 114 and then supplies the result to the subtracter 113 and the adder 123. The variable length encoder 120 subjects the quantized output to a variable-length encoding and then supplies the result to the code amount controller 117 while outputting it via the output terminal 124. The code amount controller 117 performs a code amount control based on a target code amount for each unit section input from the code amount allocator 107 and an actually generated code amount input from the variable-length encoder 120.

Operation of First Embodiment

Next, the operation of the first embodiment will be described in detail with reference the attached drawings.

According to the present invention, the two-pass system is employed to encode moving image data in a variable bit rate mode.

First, an operation in a first pass will be described below.

The correlation between a predictive error power and the generated code amount obtained through an inter motion-compensation-frame prediction is utilized in a first pass. Thus, a target code amount allocated for each unit section is decided according to the magnitude of a predictive error power for each unit section.

In the first embodiment, one unit section is defined as, GOP (Group Of Pictures) formed of plural frames.

Image data input via the input terminal is supplied to the input buffer 102, likewise the prior art example. The input buffer 102 rearranges the image data in the order of encoded frames and then supplies them to the subtracter 103 in macroblock units.

The subtracter 103 receives compressed macroblock data output from the input buffer 102 and reference macroblock data motion-compensated with the motion compensator 105 to obtain interframe predictive error signals thereof, thus supplying them to the code amount allocator 107.

The compressed macroblock data for one frame does not undergo the inter motion-compensation-frame prediction but is directly input to the code amount allocator 107.

The motion vector searcher 104 receives compressed macroblock data input from the input buffer 102 and reference frame data from the frame memory 106 and then calculates a motion vector through a block matching process to the macroblock data within a reference data search range.

The reference frame data saved in the frame memory 106 is the image data itself previously input from the input buffer 102. In other words, the motion vector searcher 104 obtains a motion vector using image data input from the input buffer 102, together with the compressed frame and the reference frame. The resultant motion vector value is stored in the motion vector memory 114 for each macroblock and is used in an actual encoding process during the second pass.

The code value allocator 107 obtains the power per GOP of a predictive error signal input from the subtracter 103 and then decides a target code amount allocated for each GOP during the actual second pass encoding according to the power per GOP of the predictive error signal.

Figure 8:
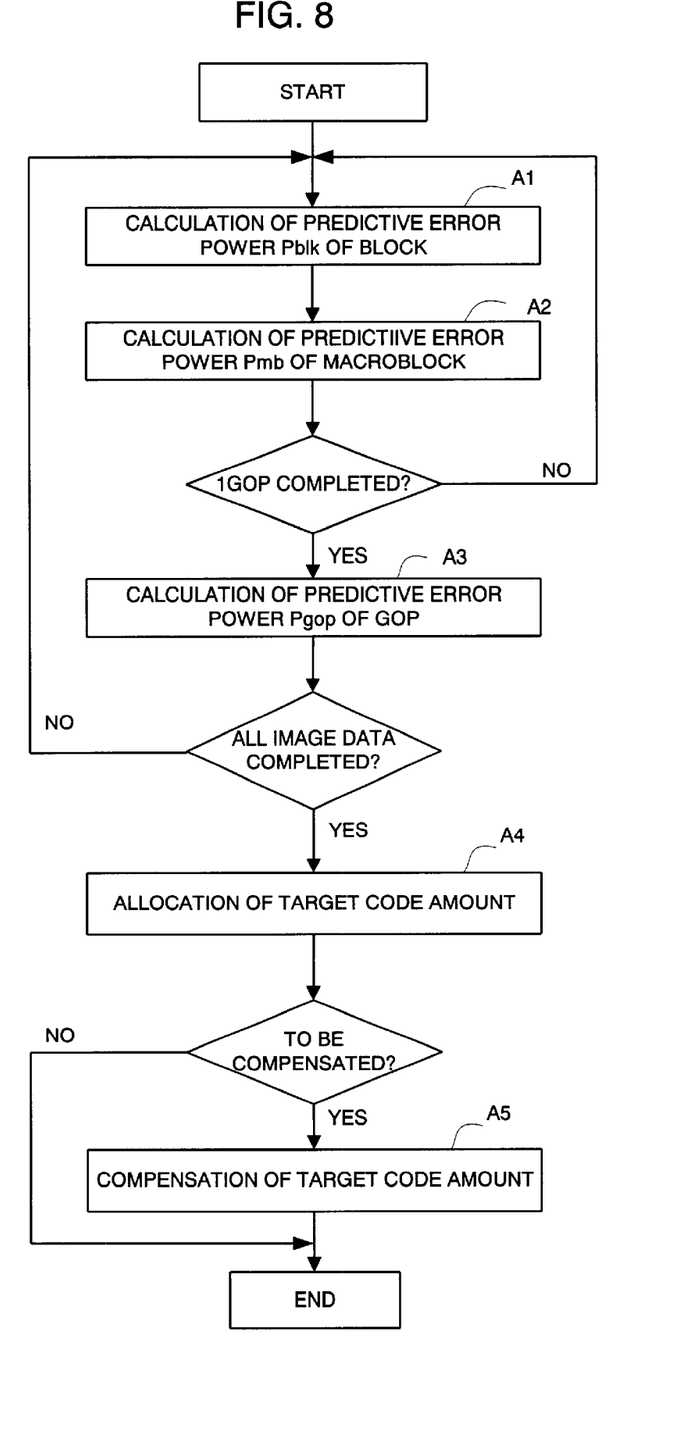
FIG. 8 is a flow chart illustrating the process procedure of the code allocator being the main portion of the present invention.

FIG. 8 is a flowchart illustrating a process procedure of the code amount allocator 107.

Figure 9:
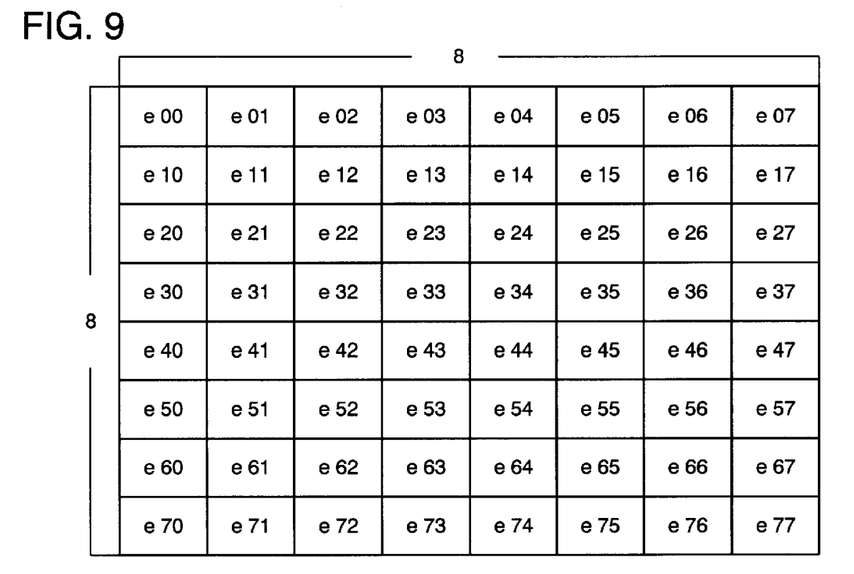
FIG. 9 is a diagram showing each of pixel components of a predictive error signal in the macroblock.

Referring to FIG. 8, a predictive error power for each block of a predictive error signal input in macroblock units is first calculated in the step A1. For instance, it is now assumed that respective pixel components of a predictive error signal in a block are as shown in FIG. 9. In such a case, the block predictive error power Pblk can be obtained using the sum total of differential absolute value sums between each pixel component and average predictive error, as shown in the formulas (1), (2) and (3).

$$sum = \sum_{i=0}^{7} \sum_{j=0}^{7} eij$$

ave=sum/64 [formula 2]

$$P_{blk} = \sum_{i=0}^{7} \sum_{j=0}^{7} |eij - ave|$$

Next, the predictive error power Pmb of a macroblock is obtained in the step A2.

If one macroblock is formed of blk_num blocks, the predictive error power Pmb of the macroblock is calculated in accordance with the following formula (4).

$$Pmb = \sum_{i=0}^{blk\_num-1} P_{blki}$$

As previously described as to the prior art, one macroblock is formed of 4 brightness blocks and 2, 4, or 8 color difference blocks, each of which is decided by a thinned-out type. In the calculation of the predictive error power Pmb of a macroblock, the process may be simplified using the sum of all brightness blocks and all color difference blocks or using the sum of only four brightness blocks.

Next, the predictive error power Pgop of 1GOP is calculated and stored in the step A3.

Assuming that the number of macroblocks within one frame is mb_num and that the number of frames of 1GOP is frame_num, the predictive error power Pgop is obtained according to the formula (5).

$$P_{gop} = \sum_{i=0}^{frame\_num-1} \sum_{j=0}^{mb\_num-1} P_{mbif}$$

The steps A1 to A3 are repeated until the entire image data are completely processed.

Next, at the time the entire image data has been completely processed, a target code amount allocated to each GOP is decided based on the predictive error power of each GOP and the predictive error power of the entire image, in the step A4.

Where it is assumed that the GOP number of the entire image data is gop_num, the predictive error power Pall of the entire image data can be obtained according to the formula (6). Where it is assumed that the code amount of the entire image data is D, the target code amount Dgop allocated to each GOP is obtained according to the formula (7).

$$P_{all} = \sum_{i=0}^{gop\_num-1} P_{gopi}$$

$Dgop=D\times(Pgop/Pall)$ [formula 7]

The encoding rate Rgop of each GOP is obtained according to the formula (8).

$Rgop=Dgop\times(frame\_rate/frame\_num)$ [formula 8]

where frame_rate is the number of frames per second.

As described above, the target code amount Dgop obtained by the proportional allotment may be used without any change based on the predictive error power Pgop of each GOP and based on the predictive error power Pall of the entire image data. However, the target code amount may be corrected such that the encoding rate Rgop of each GOP is set within a certain range in the step A5.

The target code amount Dgop is calculated through the simple proportional allotment expressed by the formula (7). Accordingly, when the encoder requires the maximum encoding rate Rmax or minimum encoding rate Rmini, the encoding rate Rgop for each GOP obtained in the step A4 may exceed the maximum encoding rate Rmax or be lower than the minimum encoding rate Rmini. The target code amount for each GOP is corrected using the conversion function (9) with parameters being variables a and k. The encoding rate R'gop for eacg GOP obtained by the formula (10) is set within the range between the maximum encoding rate Rmax and the minimum encoding rate Rmini.

$D'gop=a\times Dgop^k$ [formula 9]

$R'gop=D'gop\times(frame\_rate/frame\_num)$ [formula 10]

Figure 10A:
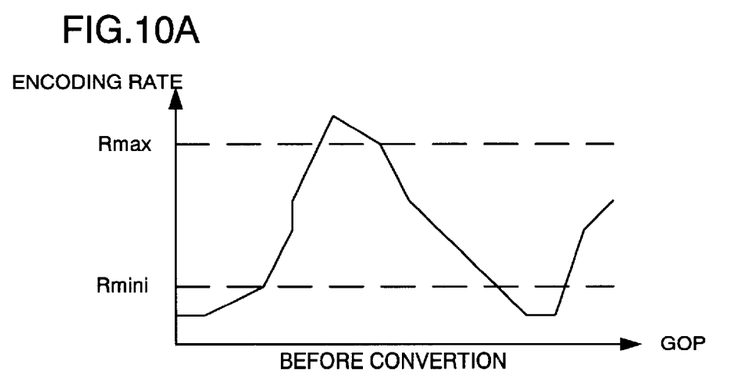
FIG. 10A is a diagram showing an encoding rate magnitude characteristic before conversion.
Figure 10B:
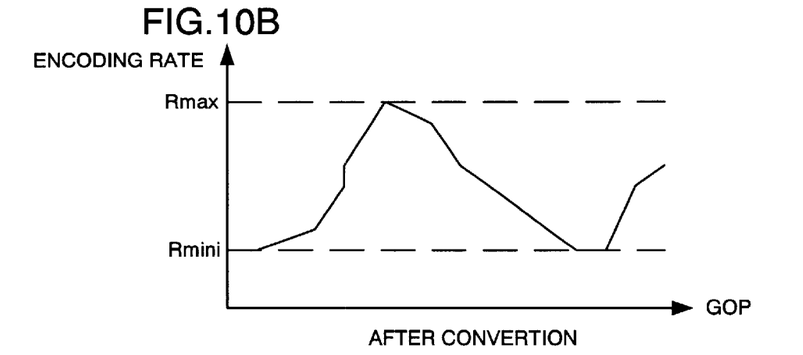
FIG. 10B is a diagram showing an encoding rate magnitude characteristic after conversion according to the present invention.

FIG. 10A is a diagram illustrating a characteristic plotting changes in encoding rate Rgop before encoding. FIG. 10B is a diagram illustrating a characteristic plotting changes in encoding rate R'gop after encoding. The oscillating degree of the encoding rate in the characteristic before encoding shown in FIG. 10A is compressed by conversion functions. Thus, as shown in FIG. 10B, the oscillating degree is set within the range between the maximum rate Rmax and the minimum rate Rmini.

In the above operation, a target code amount is allocated according to the degree of the power of a predictive error in an inter motion-compensation-frame prediction and the result has a correlation between the power of the predictive error and the generation code amount. Accordingly, as shown in the prior art, a characteristic, which is similar to the result obtained by allocating a target code amount, can be obtained based on the code amount generated when temporary encoding is performed with a constant quantized step size.

Next, the operation in a second pass will be explained below.

In the second pass, an actual encoding process is performed while the generated code amount is controlled to match the target code amount Dgop of each GOP obtained in the first pass.

The motion compensator 115 receives reference frame data from the frame memory 116. The motion compensator 115 motion-compensates the reference frame data with the motion vector sent from the motion vector memory 114. Thus, the motion compensator 115 creates motion-compensated reference macroblock data and then supplies it to the subtracter 113.

The motion vector memory 114 is a memory which stores in macroblock units a motion vector value detected by the motion-vector searcher 104 in the first pass encoding. In other words, the motion vector searching process for inter motion-compensation-frame prediction is not performed in an actual second pass encoding. However, the result obtained in the first pass encoding is referred to without any change.

The code amount controller 117 receives a target code amount from the code amount allocator 107, in GOP units allocated based on the power of an inter motion-compensation-frame prediction error in the first pass, and a code amount actually generated in the second pass from the variable length encoder 120. The code amount controller 117 decides a suitably-quantized step size based on the difference between the target code amount and the actually generated code amount and then supplies it to the quantizer 119. Thus, the code amount is controlled so as to bring the generated code amount to the target code amount.

Other operations in the second pass are similar to those in the previously described prior art. Hence, duplicated explanation will be omitted here.

As described above, when moving image data is encoded at a variable bit rate and in the two pass system, the target code amount for each GOP is allocated using the power of an inter motion compensation frame predictive error in the first pass. Alternatively, the moving vector search process for inter motion compensation frame prediction in an actual second pass encoding is omitted and the vector value obtained in the first pass is used without any change. Thus, by performing only once a sequence of encoding steps including DCT, quantization, variable length encoding, inverse DCT, inverse quantization and motion vector search is performed, the two-pass system variable bit rate encoding can be performed at high speed.

In the present embodiment, one unit section is processed in GOP units. However, a sequence longer or shorter than GOP may be processed, for example, in one frame units.

Second Embodiment

Next, the second embodiment of the present invention will be described in detail by referring to the attached drawings.

Figure 2:
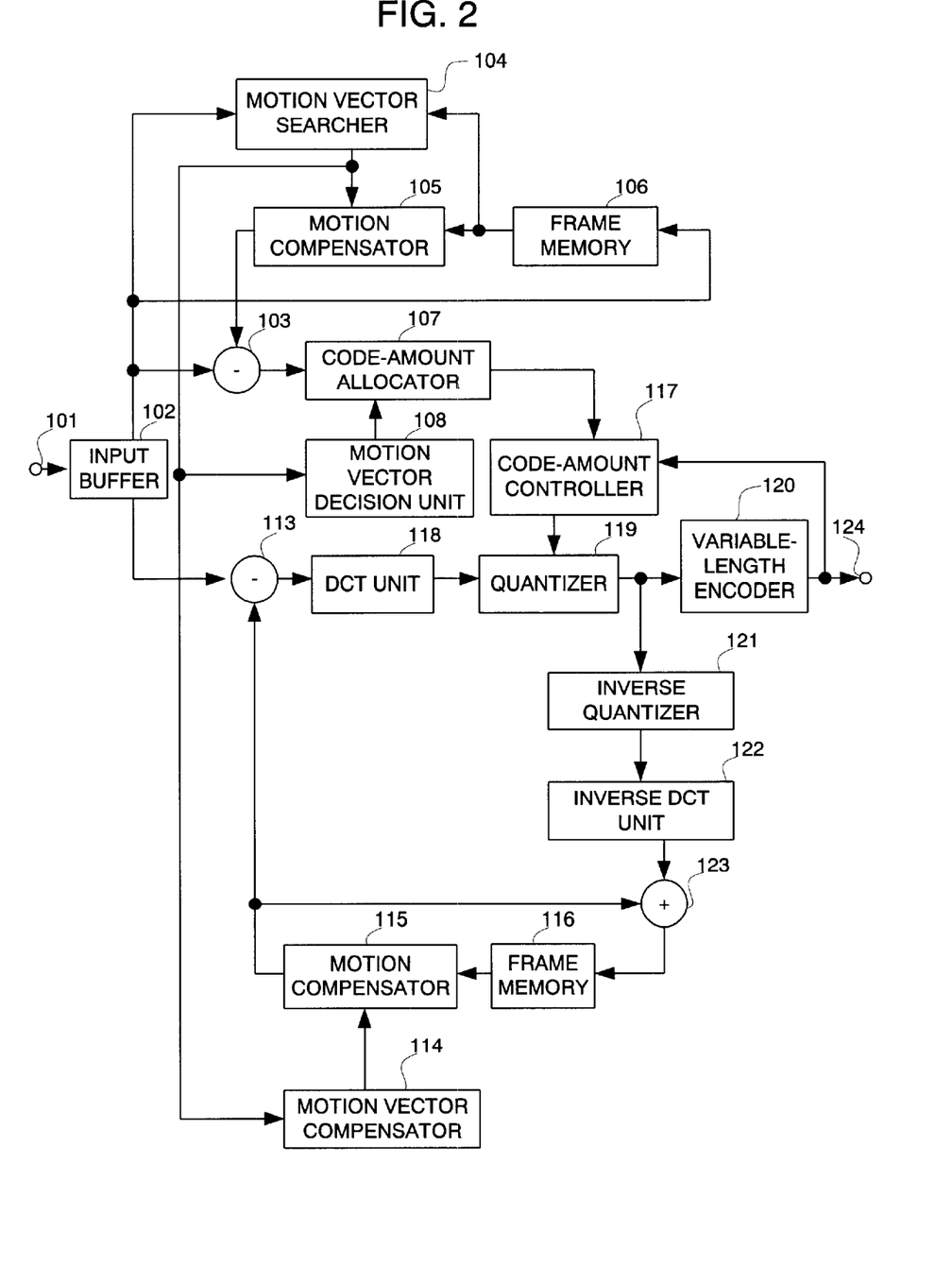
FIG. 2 is a block diagram illustrating a variable bit-rate coding device according to a second embodiment of the present invention.

FIG. 2 is a block diagram illustrating a variable bit rate encoding device according to the second embodiment of the present invention.

Referring the FIG. 2, the motion vector decision unit 108 receives the output from the motion vector searcher 104 and then outputs its output to the code amount allocator 107. Other configuration of FIG. 2 is similar to that in the first embodiment shown in FIG. 1.

In the first embodiment, the code amount allocator 107 decides a target code amount for each GOP in proportional allotment of the power of an inter motion compensation frame predictive error. However, in the second embodiment, the motion vector decision unit 108 decides the movement of a motion vector, which is an output of the motion vector searcher 104. Thus, the motion vector decision unit 108 adjusts an allocated target code amount according to the movement of the motion vector.

For instance, a human's eyesight has the characteristic in that degradation in image quality of a fast moving image is not noticeable compared with degradation in image quality of a slowly moving image. The GOP in a scene with a movement of more than a certain degree is set to a smaller value than a target code amount obtained through a proportional allotment. The remaining component is allocated to the GOP on another scene with small movement.

It is now assumed that the movement Mmb per macroblock is the product of the horizontal component MVh of a motion vector and the vertical component MVv of the motion vector. The movement Mmb per macroblock, for example, is expressed by the following formula (11)

$$Mmb = MVh \times MVv \qquad [\text{Equation 11}]$$

Moreover, the movement Mgop of GOP is obtained by the following formula (12).

$$M_{gop} = \sum_{i=0}^{mb\_num-1} \sum_{j=0}^{frame\_num-1} M_{mbif}$$

where mb_num is the number of macroblocks within one frame and frame_num is the number of frames of one GOP.

When the movement Mgop exceeds a predetermined threshold value, it is assumed that the picture has a movement of a certain degree or more. Thus, GOP is set to a smaller value than a target code amount obtained in the proportional allotment. The setting is preferentially allocated to GOP with small movement Mgop.

In the second embodiment, the motion vector decision unit 108 adjusts a target code amount to be allocated merely based on the magnitude of a movement. However, the motion vector decision unit 108 may decide the type of motion such as panning or zooming based on, for example, movements and then adjusts the scene of which degradation is visually noticeable, to allocate a target code amount to a larger value.

As described above, the present invention has the advantage in that the two-system variable bit rate encoding can be processed at high speed.

The reason is that the power of an inter motion compensation frame predictive error is used in a first pass to allocate a target code amount for each GOP. Moreover, the motion vector searching process for inter motion compensation frame prediction in an actual encoding in the second pass is omitted and the vector value obtained in the first pass is used without any change.

That is, the process is completed by once performing a sequence of encoding steps including DCT, quantization, variable length encoding, inverse DCT, inverse quantization, and motion vector searching. Accordingly, the use of the two pass system variable bit rate encoding allows an encoding process to be performed in a process time equivalent to that in the constant bit rate encoding.

The entire disclosure of Japanese Application No. 11-260753 filed Sep. 14, 1999 including specification, claims, drawing and summary are incorporated herein by reference in its entirely.

What is claimed is:

1. A two-pass system variable bit-rate encoding device, wherein the moving picture data in encoded at a variable bit rate, comprising:

first encoding means for calculating a power for each unit section of a predictive error, using correlation between the power of a predictive error in inter motion compensation frame prediction and a generated code amount in a first pass, and for determining a target code amount allocated to each unit section in a second pass encoding, according to the magnitude of the predictive error power of the whole image data and the magnitude of the predictive error power for each unit section; and second encoding means for performing an encoding process while controlling a generated code amount to adjust said target code amount for each unit section in the second pass.

2. The variable bit-rate encoding device defined in claim 1, wherein a target code amount is allocated in proportional distribution based on a predictive error power in each unit section and based on a predictive error power of the whole image data.

3. The variable bit-rate encoding device defined in claim 1, wherein a target code amount is compensated to set a coded rate within a predetermined range based on a predictive error power in each unit section and based on a predictive error power of the whole image data.

4. The variable bit-rate encoding device defined in claim 1, wherein a motion vector value, which is obtained by searching a motion vector for inter motion compensation frame prediction in the first pass by means of said first encoding means, is used without any change during a second pass encoding by said second encoding means, so that the motion vector searching process in the second pass is omitted.

5. The variable bit-rate encoding device defined in claim 2, wherein a motion vector value, which is obtained by searching a motion vector for inter motion compensation frame prediction in the first pass by means of said first encoding means, is used without any change during a second pass encoding by said second encoding means, so that the motion vector searching process in the second pass is omitted.

6. The variable bit-rate encoding device defined in claim 3, wherein a motion vector value, which is obtained by searching a motion vector for inter motion compensation frame prediction in the first pass by means of said first encoding means, is used without any change during a second pass encoding by said second encoding means, so that the motion vector searching process in the second pass is omitted.

7. The variable bit-rate encoding device defined in claim 1, wherein said first encoding means comprises:

a first subtracter for receiving compressed macroblock image data rearranged in an encoding frame order by an input buffer and reference macroblock image data motion-compensated by a first motion compensator (to be defined later) and then calculating an inter frame predictive error signal of said two sets of image data;

a first frame memory for storing macroblock image data output from said input buffer;

a motion vector searcher for receiving said reference macroblock image data from said first frame memory and compressed macroblock image data from said input buffer, and then performing a block matching process to macroblock data within a research range of said reference macroblock image data, thus obtaining a motion vector;

a first motion compensator for receiving said motion vector from said motion vector searcher and then creating said reference macroblock image data motion-compensated; and a code-amount allocator for obtaining a power of each GOP (Group of Pictures), said GOP being configured of a plurality of frames of said inter frame predictive error signal supplied from said first subtracter, and then determining a target code amount allocated to each GOP in an actual encoding process by said second encoding means according to the power of a predictive error signal for each GOP.

8. The variable bit-rate encoding device defined in claim 2 wherein said first encoding means comprises:

a first subtracter for receiving compressed macroblock image data rearranged in an encoding frame order by an input buffer and reference macroblock image data motion-compensated by a first motion compensator (to be defined later) and then calculating an inter frame predictive error signal of said two sets of image data;

a first frame memory for storing macroblock image data output from said input buffer;

a motion vector searcher for receiving said reference macroblock image data from said first frame memory and compressed macroblock image data from said input buffer, and then performing a block matching process to macroblock data within a research range of said reference macroblock image data, thus obtaining a motion vector;

a first motion compensator for receiving said motion vector from said motion vector searcher and then creating said reference macroblock image data motion-compensated; and a code-amount allocator for obtaining a power of each GOP (Group of Pictures), said GOP being configured of a plurality of frames of said inter frame predictive error signal supplied from said first subtracter, and then determining a target code amount allocated to each COP in an actual encoding process by said second encoding means according to the power of a predictive error signal for each GOP.

9. The variable bit-rate encoding device defined in claim 3, wherein said first encoding means comprises:

a first subtracter for receiving compressed macroblock image data rearranged in an encoding frame order by an input buffer and reference macroblock image data motion-compensated by a first motion compensator (to be defined later) and then calculating an inter frame predictive error signal of said two sets of image data;

a first frame memory for storing macroblock image data output from said input buffer;

a motion vector searcher for receiving said reference macroblock image data from said first frame memory and compressed macroblock image data from said input buffer, and then performing a block matching process to macroblock data within a research range of said reference macroblock image data, thus obtaining a motion vector;

a first motion compensator for receiving said motion vector from said motion vector searcher and then creating said reference macroblock image data motion-compensated; and a code-amount allocator for obtaining a power of each GOP (Group of Pictures), said GOP being configured of a plurality of frames of said inter frame predictive error signal supplied from said first subtracter, and then determining a target code amount allocated to each GOP in an actual encoding process by said second encoding means according to the power of a predictive error signal for each GOP.

10. The variable bit-rate encoding device defined in claim 4, wherein said first encoding means comprises:

a first subtracter for receiving compressed macroblock image data rearranged in an encoding frame order by an input buffer and reference macroblock image data motion-compensated by a first motion compensator (to be defined later) and then calculating an inter frame predictive error signal of said two sets of image data;

a first frame memory for storing macroblock image data output from said input buffer;

a motion vector searcher for receiving said reference macroblock image data from said first frame memory and compressed macroblock image data from said input buffer, and then performing a block matching process to macroblock data within a research range of said reference macroblock image data, thus obtaining a motion vector;

a first motion compensator for receiving said motion vector from said motion vector searcher and then creating said reference macroblock image data motion-compensated; and a code-amount allocator for obtaining a power of each GOP (Group of Pictures), said GOP being configured of a plurality of frames of said inter frame predictive error signal supplied from said first subtracter, and then determining a target code amount allocated to each GOP in an actual encoding process by said second encoding means according to the power of a predictive error signal for each GOP.

11. The variable bit-rate encoding device defined in claim 5, wherein said first encoding means comprises:

a first subtracter for receiving compressed macroblock image data rearranged in an encoding frame order by an input buffer and reference macroblock image data motion-compensated by a first motion compensator (to be defined later) and then calculating an inter frame predictive error signal of said two sets of image data;

a first frame memory for storing macroblock image data output from said input buffer;

a motion vector searcher for receiving said reference macroblock image data from said first frame memory and compressed macroblock image data from said input buffer, and then performing a block matching process to macroblock data within a research range of said reference macroblock image data, thus obtaining a motion vector;

a first motion compensator for receiving said motion vector from said motion vector searcher and then creating said reference macroblock image data motion-compensated; and a code-amount allocator for obtaining a power of each GOP (Group of Pictures), said GOP being configured of a plurality of frames of said inter frame predictive error signal supplied from said first subtracter, and then determining a target code amount allocated to each GOP in an actual encoding process by said second encoding means according to the power of a predictive error signal for each GOP.

12. The variable bit-rate encoding device defined in claim 6, wherein said first encoding means comprises:

a first subtracter for receiving compressed macroblock image data rearranged in an encoding frame order by an input buffer and reference macroblock image data motion-compensated by a first motion compensator (to be defined later) and then calculating an inter frame predictive error signal of said two sets of image data;

a first frame memory for storing macroblock image data output from said input buffer;

a motion vector searcher for receiving said reference macroblock image data from said first frame memory and compressed macroblock image data from said input buffer, and then performing a block matching process to macroblock data within a research range of said reference macroblock image data, thus obtaining a motion vector;

a first motion compensator for receiving said motion vector from said motion vector searcher and then creating said reference macroblock image data motion-compensated; and a code-amount allocator for obtaining a power of each (OP (Group of Pictures), said GOP being configured of a plurality of frames of said inter frame predictive error signal supplied from said first subtracter, and then determining a target code amount allocated to each GOP in an actual encoding process by said second encoding means according to the power of a predictive error signal for each GOP.

13. The variable bit-rate encoding device defined in claim 7, wherein said second encoding means comprises:

a second subtracter for receiving compressed macroblock image data rearranged in an encoding frame order by an input buffer and reference macroblock image data motion-compensated by a second motion compensator (to be defined later) and then calculating an inter frame predictive error signal of said two sets of image data;

a DCT unit for performing a DCT process of an inter frame predictive error signal output from said second subtracter;

a quantizer for quantizing a DCT output from said DCT unit;

an inverse quantizer for inverse quantizing a quantized output from said quantizer;

an inverse DCT unit for performing an inverse DCT unit of an output from said inverse quantizer;

an adder for adding an output from said inverse DCT unit and reference macroblock image data motion-compensated by a second motion compensator (to be defined later);

a motion vector memory for storing said motion vector output from said motion vector searcher;

a second frame memory for storing an output from said adder;

a second motion compensator for motion-compensating reference frame data supplied from said second frame memory with a motion vector from said motion vector memory and then supplying the result to said second subtracter and said adder;

a variable length encoder for variable-length-encoding a quantized output from said quantizer; and a code-amount allocator for controlling a code amount based on a code amount actually generated from said variable-length encoder and based on a target code amount for each unit section output from said code amount allocater in said first encoding means.

14. The variable bit-rate encoding device defined in claim 8, wherein said second encoding means comprises:

a second subtracter for receiving compressed macroblock image data rearranged in an encoding frame order by an input buffer and reference macroblock image data motion-compensated by a second motion compensator (to be defined later) and then calculating an inter frame predictive error signal of said two sets of image data;

a DCT unit for performing a DCT process of an inter frame predictive error signal output from said second subtracter;

a quantizer for quantizing a DCT output from said DCT unit;

an inverse quantizer for inverse quantizing a quantized output from said quantizer;

an inverse DCT unit for performing an inverse DCT unit of an output from said inverse quantizer;

an adder for adding an output from said inverse DCT unit and reference macroblock image data motion-compensated by a second motion compensator (to be defined later);

a motion vector memory for storing said motion vector output from said motion vector searcher;

a second frame memory for storing an output from said adder;

a second motion compensator for motion-compensating reference frame data supplied from said second frame memory with a motion vector from said motion vector memory and then supplying the result to said second subtracter and said adder;

a variable length encoder for variable-length-encoding a quantized output from said quantizer; and a code-amount allocator for controlling a code amount based on a code amount actually generated from said variable-length encoder and based on a target code amount for each unit section output from said code amount allocater in said first encoding means.

15. The variable bit-rate encoding device defined in claim 9, wherein said second encoding means comprises:

a second subtracter for receiving compressed macroblock image data rearranged in an encoding frame order by an input buffer and reference macroblock image data motion-compensated by a second motion compensator (to be defined later) and then calculating an inter frame predictive error signal of said two sets of image data;

a DCT unit for performing a DCT process of an inter frame predictive error signal output from said second subtracter;

a quantizer for quantizing a DCT output from said DCT unit;

an inverse quantizer for inverse quantizing a quantized output from said quantizer;

an inverse DCT unit for performing an inverse DCT unit of an output from said inverse quantizer;

an adder for adding an output from said inverse DCT unit and reference macroblock image data motion-compensated by a second motion compensator (to be defined later);

a motion vector memory for storing said motion vector output from said motion vector searcher;

a second frame memory for storing an output from said adder;

a second motion compensator for motion-compensating reference frame data supplied from said second frame memory with a motion vector from said motion vector memory and then supplying the result to said second subtracter and said adder;

a variable length encoder for variable-length-encoding a quantized output from said quantizer; and a code-amount allocator for controlling a code amount based on a code amount actually generated from said variable-length encoder and based on a target code amount for each unit section output from said code amount allocater in said first encoding means.

16. The variable bit-rate encoding device defined in claim 10, wherein said second encoding means comprises:

a second subtracter for receiving compressed macroblock image data rearranged in an encoding frame order by an input buffer and reference macroblock image data motion-compensated by a second motion compensator (to be defined later) and then calculating an inter frame predictive error signal of said two set of image data;

a DCT unit for performing a DCT process of an inter frame predictive error signal output from said second subtracter;

a quantizer for quantizing a DCT output from said DCT unit;

an inverse quantizer for inverse quantizing a quantized output from said quantizer;

an inverse DCT unit for performing an inverse DCT unit of an output from said inverse quantizer;

an adder for adding an output from said inverse DCT unit and reference macroblock image data motion-compensated by a second motion compensator (to be defined later);

a motion vector memory for storing said motion vector output from said motion vector searcher;

a second frame memory for storing an output from said adder;

a second motion compensator for motion-compensating reference frame data supplied from said second frame memory with a motion vector from said motion vector memory and then supplying the result to said second subtracter and said adder;

a variable length encoder for variable-length-encoding a quantized output from said quantizer; and a code-amount allocator for controlling a code amount based on a code amount actually generated from said variable-length encoder and based on a target code amount for each unit section output from said code amount allocater in said first encoding means.

17. The variable bit-rate encoding device defined in claim 11, wherein said second encoding means comprises:

a second subtracter for receiving compressed macroblock image data rearranged in an encoding frame order by an input buffer and reference macroblock image data motion-compensated by a second motion compensator (to be defined later) and then calculating an inter frame predictive error signal of said two sets of image data;

a DCT unit for performing a DCT process of an inter frame predictive error signal output from said second subtracter;

a quantizer for quantizing a DCT output from said DCT unit;

an inverse quantizer form inverse quantizing a quantized output from said quantizer;

an inverse DCT unit for performing an inverse DCT unit of an output from said inverse quantizer;

an adder for adding an output from said inverse DCT unit and reference macroblock image data motion-compensated by a second motion compensator (to be defined later);

a motion vector memory for storing said motion vector output from said motion vector searcher;

a second frame memory for storing an output from said adder;

a second motion compensator for motion-compensating reference frame data supplied from said second frame memory with a motion vector from said motion vector memory and then supplying the result to said second subtracter and said adder;

a variable length encoder for variable-length-encoding a quantized output from said quantizer; and a code-amount allocator for controlling a code amount based on a code amount actually generated from said variable-length encoder and based on a target code amount for each unit section output from said code amount allocater in said first encoding means.

18. The variable bit-rate encoding device defined in claim 12, wherein said second encoding means comprises:

a second subtracter for receiving compressed macroblock image data rearranged in an encoding frame order by an input buffer and reference macroblock image data motion-compensated by a second motion compensator (to be defined later) and then calculating an inter frame predictive error signal of said two sets of image data;

a DCT unit for performing a DCT process of an inter frame predictive error signal output from said second subtracter;

a quantizer for quantizing a DCT output from said DCT unit;

an inverse quantizer for inverse quantizing a quantized output from said quantizer;

an inverse DCT unit for performing an inverse DCT unit of an output from said inverse quantizer;

an adder for adding an output from said inverse DCT unit and reference macroblock image data motion-compensated by a second motion compensator (to be defined later);

a motion vector memory for storing said motion vector output from said motion vector searcher;

a second frame memory for storing an output from said adder;

a second motion compensator for motion-compensating reference frame data supplied from said second frame memory with a motion vector from said motion vector memory and then supplying the result to said second subtracter and said adder;

a variable length encoder for variable-length-encoding a quantized output from said quantizer; and a code-amount allocator for controlling a code amount based on a code amount actually generated from said variable-length encoder and based on a target code amount for each unit section output from said code amount allocater in said first encoding means.

19. The variable bit-rate encoding device defined in claim 13, further comprising a motion vector decision unit for supplying an output from said motion vector searcher to said code-amount allocator, and wherein said motion vector decision unit decides a motion vector movement output from said motion vector searcher and adjusts a target code amount to be allocated according to said motion vector movement.

20. The variable bit-rate encoding device defined in claim 14, further comprising a motion vector decision unit for supplying an output from said motion vector searcher to said code-amount allocator, and wherein said motion vector decision unit decides a motion vector movement output from said motion vector searcher and adjusts a target code amount to be allocated according to said motion vector movement.

21. The variable bit-rate encoding device defined in claim 15, further comprising a motion vector decision unit for supplying an output from said motion vector searcher to said code-amount allocator, and wherein said motion vector decision unit decides a motion vector movement output from said motion vector searcher and adjusts a target code amount to be allocated according to said motion vector movement.

22. The variable bit-rate encoding device defined in claim 16, further comprising a motion vector decision unit for supplying an output from said motion vector searcher to said code-amount allocator, and wherein said motion vector decision unit decides a motion vector movement output from said motion vector searcher and adjusts a target code amount to be allocated according to said motion vector movement.

23. The variable bit-rate encoding device defined in claim 17, further comprising a motion vector decision unit for supplying an output from said motion vector searcher to said code-amount allocator, and wherein said motion vector decision unit decides a motion vector movement output from said motion vector searcher and adjusts a target code amount to be allocated according to said motion vector movement.

24. The variable bit-rate encoding device defined in claim 18, further comprising a motion vector decision unit for supplying an output from said motion vector searcher to said code-amount allocator, and wherein said motion vector decision unit decides a motion vector movement output from said motion vector searcher and adjusts a target code amount to be allocated according to said motion vector movement.

25. The variable bit-rate encoding device defined in claim 1, wherein said first and second subtracters are integrated as one piece and each one-piece component is shared in time divisional mode, using said first encoding means and said second encoding means.

26. The variable bit-rate encoding device defined in claim 1, wherein said first and second motion compensators are integrated as one piece and each one-piece component is shared in time divisional mode, using said first encoding means and said second encoding means.

27. The variable bit-rate encoding device defined in claim 1, wherein said first and second frame memories are integrated as one piece and each one-piece component is shared in time divisional mode, using said first encoding means and said second encoding means.

* * * * *